UNITED STATES PATENT OFFICE.

ALEXANDER STRAUS, OF NEW YORK, N. Y.

COMPOSITION OF MATTER FOR USE IN THE MANUFACTURE OF EMERY-WHEELS.

SPECIFICATION forming part of Letters Patent No. 242,394, dated May 31, 1881.

Application filed April 8, 1881. (No specimens.)

*To all whom it may concern:*

Be it known that I, ALEXANDER STRAUS, of the city, county, and State of New York, have invented a new and useful Improvement in Compositions of Matter for Use in the Manufacture of Emery or Corundum Wheels; and I hereby declare that the following is a full, clear, and exact description and specification of the same.

The object of my invention is to furnish a superior tool for cutting and polishing metals, bone, and other materials.

My invention consists in a composition of curd or caseine and ground emery, or such like gritty substance, in the article of manufacture made from said composition, and also in the process by which the result is obtained—that is, by which the composition is made.

In order that persons skilled in the art may compound and produce my composition, make my article of manufacture, and practice my process, I will proceed to explain the manner in which I do the same.

I take freshly-skimmed milk and heat it to about 90° Fahrenheit, and then allow it to cool for ten or twelve hours, during which time the milk will turn to a thick jelly. I then take about three parts, by weight, of this curd, and add about two parts, by weight, of emery, corundum, ruby, or such like substance, mix them well together, and wash them, when mixed, with boiling-hot water until all greasy matters disappear, when I put the composition into molds of metal and subject it to hydraulic pressure. When removed from the mold it is in shape and is put away to dry in a drying-room.

The wheels or other articles, of course, can be of any size and shape; but my invention is intended to be used as an emery-wheel.

The proportion of curd and emery may be varied to suit different grades of emery. I have found that the proportions I have given above are the best for medium grades. The coarser the emery the greater the quantity of curd needed.

Having now fully described my composition, what I claim, and desire to secure by Letters Patent, is—

1. The composition of matter, substantially as described, consisting of caseine and emery, or such like material, as set forth.

2. The new article of manufacture described—an emery-wheel consisting of a molded compound of caseine and emery, substantially as set forth.

3. The process, substantially as described, of heating freshly-skimmed milk to 90° Fahrenheit, cooling the same, and then mixing the jelly or curd with emery or such like gritty substance, about three parts of the former and two parts of the latter, by weight, and washing the mixture with boiling water, and then subjecting the same to heavy pressure, for the purposes set forth.

ALEXANDER STRAUS.

Witnesses:
WM. C. HICKS,
PATK. H. HANLON.